United States Patent
Powell et al.

(10) Patent No.: US 11,788,492 B2
(45) Date of Patent: Oct. 17, 2023

(54) REHEAT ASSEMBLY

(71) Applicant: ROLLS-ROYCE PLC, London (GB)

(72) Inventors: Ashley Powell, Bristol (GB); Andrew Wilkinson, Bristol (GB); Eduardo Romero, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/093,091

(22) Filed: Jan. 4, 2023

(65) Prior Publication Data

US 2023/0250776 A1 Aug. 10, 2023

(30) Foreign Application Priority Data

Feb. 4, 2022 (GB) ..................................... 2201427

(51) Int. Cl.
*F02K 3/10* (2006.01)
*F23R 3/20* (2006.01)

(52) U.S. Cl.
CPC ................. *F02K 3/10* (2013.01); *F23R 3/20* (2013.01); *F05D 2220/323* (2013.01); *F05D 2240/35* (2013.01)

(58) Field of Classification Search
CPC ...... F23R 3/18; F23R 3/20; F02K 3/10; F02K 3/105; F02K 3/08; F02K 3/11
See application file for complete search history.

(56) References Cited

U.S. PATENT DOCUMENTS

| 3,158,998 A | 12/1964 | Robinson et al. |
| 3,595,024 A * | 7/1971 | Kohler ............... F02K 1/386 60/262 |
| 3,698,186 A | 10/1972 | Beane et al. |

(Continued)

FOREIGN PATENT DOCUMENTS

| EP | 0 713 057 A1 | 5/1996 |
| EP | 1229290 A2 | 8/2002 |

(Continued)

OTHER PUBLICATIONS

U.S. Appl. No. 18/149,844, filed Jan. 4, 2023 in the name of Powell et al.

(Continued)

*Primary Examiner* — Alain Chau
(74) *Attorney, Agent, or Firm* — Oliff PLC

(57) ABSTRACT

A reheat assembly for a gas turbine engine includes; a jetpipe casing defining a reheat core section configured to duct a core flow of air and a reheat bypass section configured to duct a bypass flow of air. The reheat bypass section is disposed radially outward of the reheat core section, and the reheat core section and the reheat bypass section are at least partially separated by a support duct. An integrated flameholder is mounted to the jetpipe casing, and a fuel pipe is configured to convey fuel to the integrated flameholder. The integrated flameholder includes a flameholder body extending radially inward from the jetpipe casing through the reheat bypass section and into the reheat core section to promote a wake-stabilised region downstream of the body; and an integrated atomiser configured to atomise fuel provided to the integrated flameholder and to discharge the atomised fuel into the wake stabilised region.

10 Claims, 5 Drawing Sheets

(56) References Cited

U.S. PATENT DOCUMENTS

Figure 1:
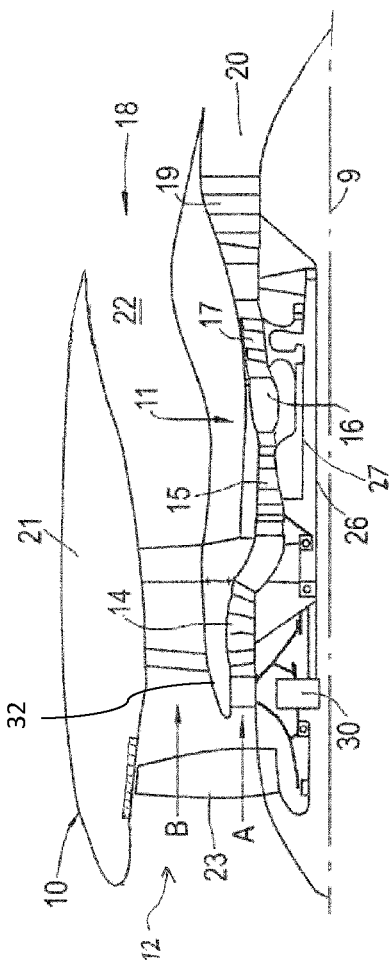

| | | | |
|---|---|---|---|
| 3,747,345 A | 7/1973 | Markowski | |
| 3,750,402 A | 8/1973 | Vdoviak et al. | |
| 4,315,401 A | 2/1982 | Beal et al. | |
| 4,720,971 A | 1/1988 | DuBell | |
| 4,887,425 A * | 12/1989 | Vdoviak | F23D 23/00 |
| | | | 60/761 |
| 4,989,407 A * | 2/1991 | Grant, Jr. | F23R 3/18 |
| | | | 60/749 |
| 5,020,318 A * | 6/1991 | Vdoviak | F01D 9/065 |
| | | | 60/761 |
| 5,117,628 A * | 6/1992 | Koshoffer | F02K 1/48 |
| | | | 60/761 |
| 5,212,945 A * | 5/1993 | Habrard | F23R 3/22 |
| | | | 60/226.3 |
| 5,367,874 A * | 11/1994 | Auffret | F23R 3/20 |
| | | | 60/749 |
| 5,396,761 A | 3/1995 | Woltmann et al. | |
| 5,396,763 A | 3/1995 | Mayer et al. | |
| 5,813,221 A | 9/1998 | Geiser et al. | |
| 6,112,516 A | 9/2000 | Beule et al. | |
| 6,125,627 A * | 10/2000 | Rice | F23R 3/28 |
| | | | 60/765 |
| 6,415,609 B1 | 7/2002 | Vacek et al. | |
| 6,668,541 B2 * | 12/2003 | Rice | F23R 3/28 |
| | | | 239/265.19 |
| 6,868,676 B1 | 3/2005 | Haynes | |
| 7,370,477 B2 * | 5/2008 | Roche | F23R 3/283 |
| | | | 60/761 |
| 7,584,615 B2 * | 9/2009 | Baboeuf | F02K 3/10 |
| | | | 60/761 |
| 7,596,950 B2 * | 10/2009 | Woltmann | F23R 3/20 |
| | | | 60/761 |
| 7,856,828 B2 * | 12/2010 | Bunel | F23R 3/20 |
| | | | 60/749 |
| 7,908,868 B2 * | 3/2011 | Bunel | F02K 3/10 |
| | | | 60/761 |
| 8,490,402 B2 * | 7/2013 | Lains | F23R 3/20 |
| | | | 60/761 |
| 11,408,610 B1 * | 8/2022 | Rich | F23R 3/28 |
| 2003/0019205 A1 * | 1/2003 | Rice | F23R 3/28 |
| | | | 60/761 |
| 2005/0086941 A1 | 4/2005 | Bunel et al. | |
| 2005/0252216 A1 | 11/2005 | Roche et al. | |
| 2005/0257527 A1 * | 11/2005 | Baboeuf | F02K 1/386 |
| | | | 60/722 |
| 2005/0281675 A1 | 12/2005 | Liang | |
| 2006/0016194 A1 * | 1/2006 | Roche | F23R 3/283 |
| | | | 60/765 |
| 2006/0213180 A1 | 9/2006 | Koshoffer | |
| 2007/0220893 A1 * | 9/2007 | Woltmann | F23R 3/20 |
| | | | 60/765 |
| 2007/0227151 A1 * | 10/2007 | Bunel | F23R 3/20 |
| | | | 60/761 |
| 2007/0227152 A1 * | 10/2007 | Bunel | F02K 3/10 |
| | | | 60/761 |
| 2010/0218505 A1 * | 9/2010 | Lains | F02C 7/266 |
| | | | 60/765 |
| 2013/0306024 A1 | 11/2013 | Rolt | |
| 2014/0360197 A1 | 12/2014 | Tanaka et al. | |
| 2016/0273365 A1 | 9/2016 | Slavens et al. | |
| 2017/0023252 A1 | 1/2017 | Tanaka et al. | |
| 2017/0089300 A1 | 3/2017 | Tanaka et al. | |

FOREIGN PATENT DOCUMENTS

| | | |
|---|---|---|
| FR | 2186608 A1 | 1/1974 |
| FR | 2900460 A1 | 11/2007 |
| FR | 2909419 A1 | 6/2008 |
| GB | 2253049 A | 8/1992 |
| GB | 2253049 B | 8/1994 |
| JP | H05-79628 A | 3/1993 |
| JP | H09-268946 A | 10/1997 |

OTHER PUBLICATIONS

U.S. Appl. No. 18/149,895, filed Jan. 4, 2023 in the name of Powell et al.

Aug. 1, 2022 Search Report issued in British Patent Application No. GB2201429.4.

Aug. 1, 2022 Search Report issued in British Patent Application No. GB2201427.8.

Jul. 29, 2022 Search Report issued in British Patent Application No. GB2201428.6.

Jun. 2, 2023 Restriction Election Issued in U.S. Appl. No. 18/149,844.

Jun. 16, 2023 Search Report issued in European Patent Application No. 23150235.2.

Jun. 14, 2023 Search Report issued in European Patent Application No. 23150233.7.

Jun. 29, 2023 Office Action Issued in U.S. Appl. No. 18/149,895.

Jul. 19, 2023 Office Action issued In U.S. Appl. No. 18/149,844.

* cited by examiner

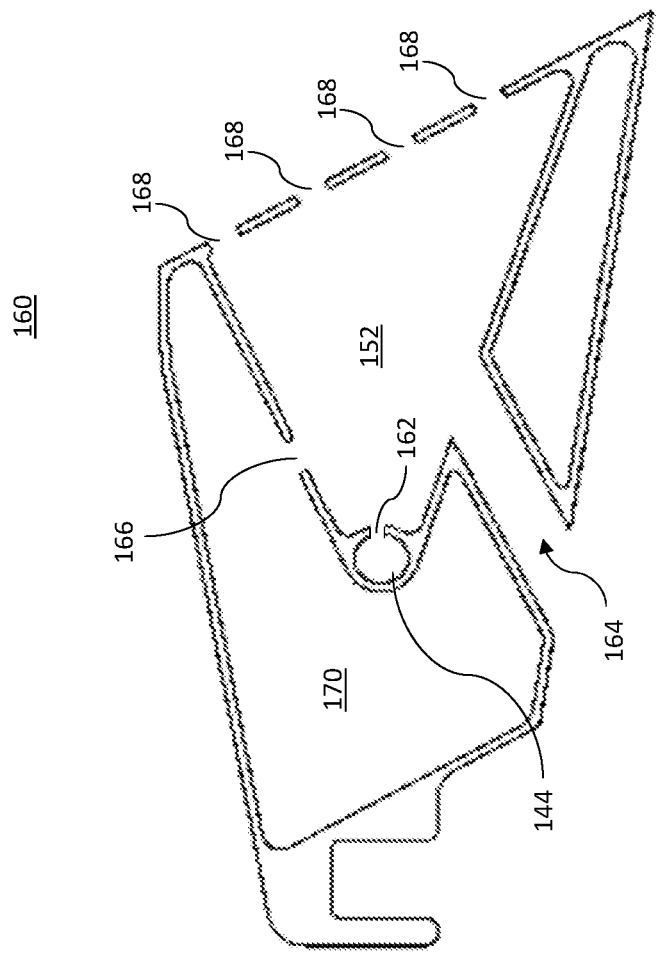
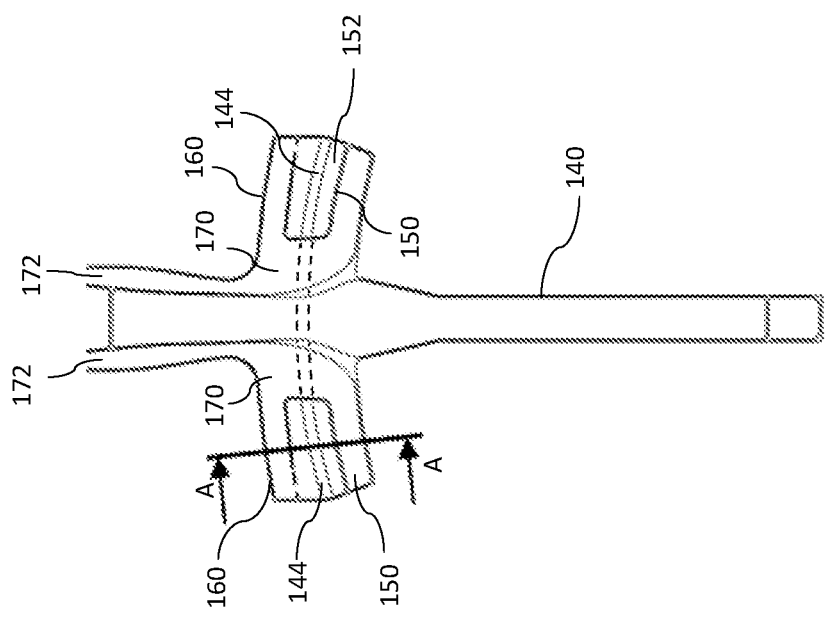
Figure 4b
Figure 4a

REHEAT ASSEMBLY

This disclosure claims the benefit of UK Patent Application No. GB 2201427.8, filed on 4 Feb. 2022, which is hereby incorporated herein in its entirety.

The present disclosure relates to a reheat assembly for a gas turbine engine, a gas turbine assembly comprising the reheat assembly, and an aircraft comprising the gas turbine engine.

Gas turbine engines may be provided with reheat assemblies incorporated within an exhaust of the gas turbine engine to provide additional thrust. Bypass air and core gas streams in the reheater module are kept separate by a duct and are permitted to mix at or just upstream of a flameholder. Fuel is typically injected into the core gas stream and ignited in a wake stabilised region, downstream of the flameholder. An annular vaporiser shell is typically disposed within the bypass gas stream just upstream of the wake-stabilised region to provide a discharge having a rich fuel-air ratio (FAR) into the wake-stabilised region, which can be easily ignited by a pilot igniter to provide a stable flame with which to ignite the fuel injected into the core gas stream.

According to an aspect of the present disclosure, there is provided a reheat assembly for a gas turbine engine, the reheat assembly comprising; a jetpipe casing defining a reheat core section configured to duct a core flow of air and a reheat bypass section configured to duct a bypass flow of air, wherein the reheat bypass section is disposed radially outward of the reheat core section, and the reheat core section and the reheat bypass section are at least partially separated by a support duct; an integrated flameholder mounted to the jetpipe casing, and a fuel pipe configured to convey fuel to the integrated flameholder, wherein the integrated flameholder comprises: a flameholder body extending radially inward from the jetpipe casing through the reheat bypass section and into the reheat core section to promote a wake-stabilised region downstream of the flameholder body; and an integrated atomiser configured to atomise fuel provided to the integrated flameholder, and to discharge the atomised fuel into the wake stabilised region.

The integrated flameholder may comprise an atomiser arm extending circumferentially from the flameholder body at a junction between the reheat core section and the reheat bypass section. The atomiser arm may comprise the integrated atomiser.

The integrated flameholder may comprises a pair of atomiser arms extending circumferentially from opposing sides of the flameholder body within the reheat bypass section. Each atomiser arm may comprise a respective integrated atomiser.

Each atomiser arm may comprise a mixing chamber, a fuel inlet to the mixing chamber, a core mixing inlet to the mixing chamber configured to receive core air from the reheat core section, a bypass mixing inlet to the mixing chamber configured to receive bypass air from the reheat bypass section, and a mixing outlet from the mixing chamber. The mixing chamber may be configured to atomise the fuel in the bypass air and core air received within the mixing chamber and to discharge the atomised fuel through the mixing outlet.

The integrated flameholder may comprise an integrated fuel conduit passing from the fuel pipe through the mixing chamber and comprising an outlet at the mixing chamber corresponding to the fuel inlet to convey fuel from the fuel pipe to the mixing chamber.

The integrated flameholder may further comprise a bypass channel configured to receive bypass air from the bypass section, and to discharge the bypass air into the mixing chamber via the bypass mixing inlet.

The bypass mixing inlet may comprise a plurality of holes. The core mixing inlet may comprise a single hole. The ratio of the area of the bypass mixing inlet to the area of the core mixing inlet may be between X and Y.

The mixing outlet may comprise an array of outlet holes distributed along the respective atomiser arm. The integrated flameholder may comprise a fuel outlet on a leading edge of the flameholder body, configured to discharge fuel into the reheat core section upstream of the wake stabilised region.

The reheat assembly may comprise a plurality of integrated flameholders circumferentially distributed around the jetpipe casing.

The reheat assembly may comprise at least one core fuel injection port and optionally at least one bypass fuel injection port disposed on, and integrated with the integrated flameholder. The at least one core fuel injection port and optionally at least one bypass fuel injection port may be disposed on a leading edge of the flameholder. The at least one core fuel injection port may be configured to discharge fuel into the core airflow A. The at least one bypass fuel injection port may be configured to discharge fuel into the bypass airflow B.

According to a second aspect of the present disclosure, there is provided a gas turbine engine comprising: an engine core; an inner casing which defines a core duct configured to convey a core flow of air through the engine core; a nacelle which defines a bypass duct configured to convey a bypass flow of air through the gas turbine engine without passing through the engine core; and a reheat assembly according to the first aspect, wherein the jetpipe casing is attached to the nacelle and the support duct is radially aligned with the inner casing such that a reheat core inlet is aligned with an outlet of the core duct and wherein the reheat bypass inlet is aligned with an outlet of the bypass duct.

According to a third aspect of the present disclosure, there is provided an aircraft comprising the gas turbine engine according to the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above. In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of a second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc.

The fan of a gas turbine as described and/or claimed herein may have any desired number of fan blades, for example 16, 18, 20, or 22 fan blades.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Figure 2:
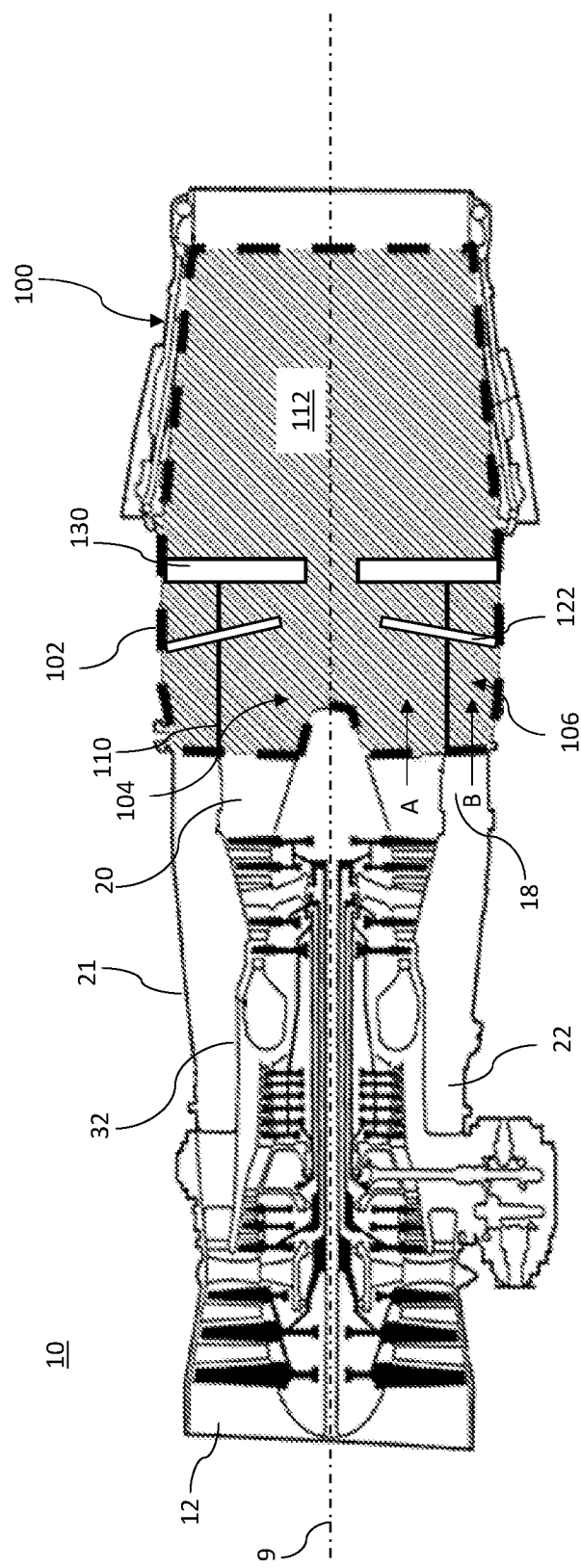
Figure 3:
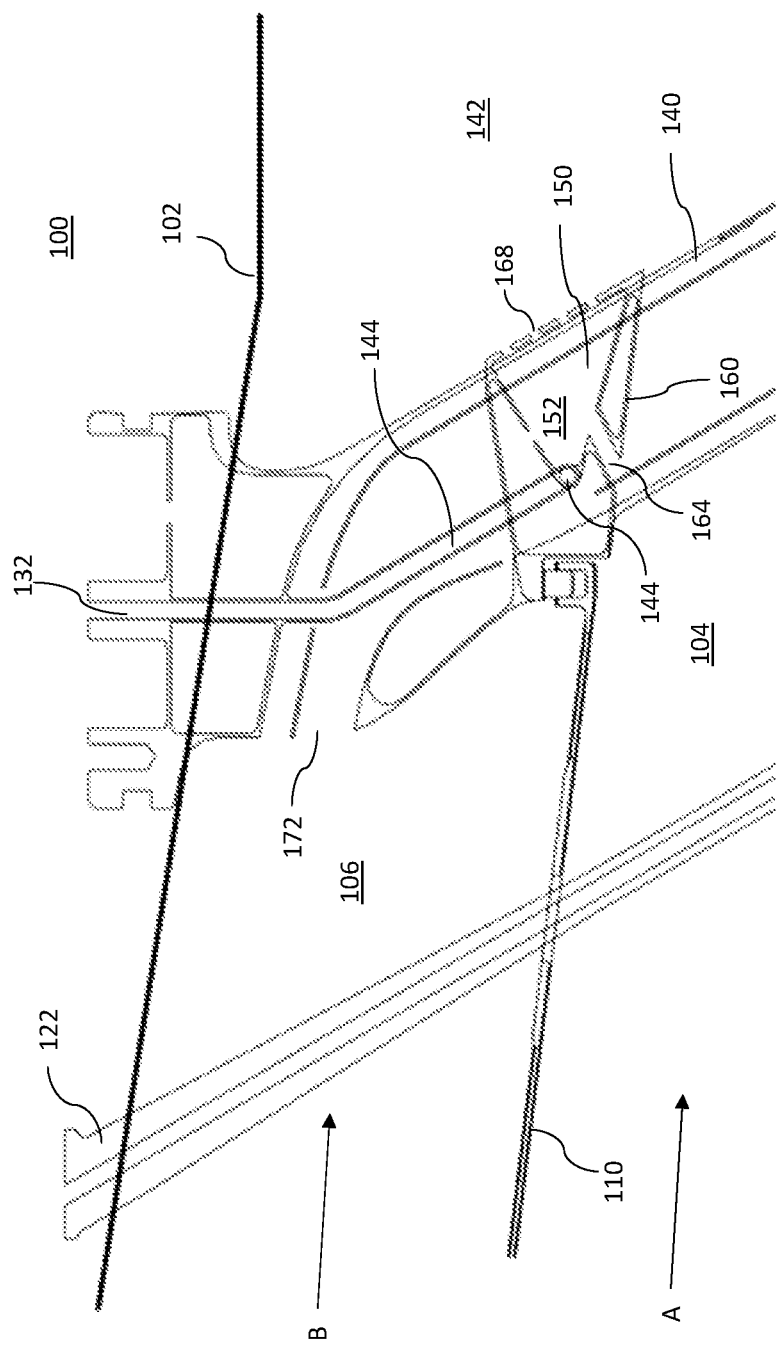
Figure 5:
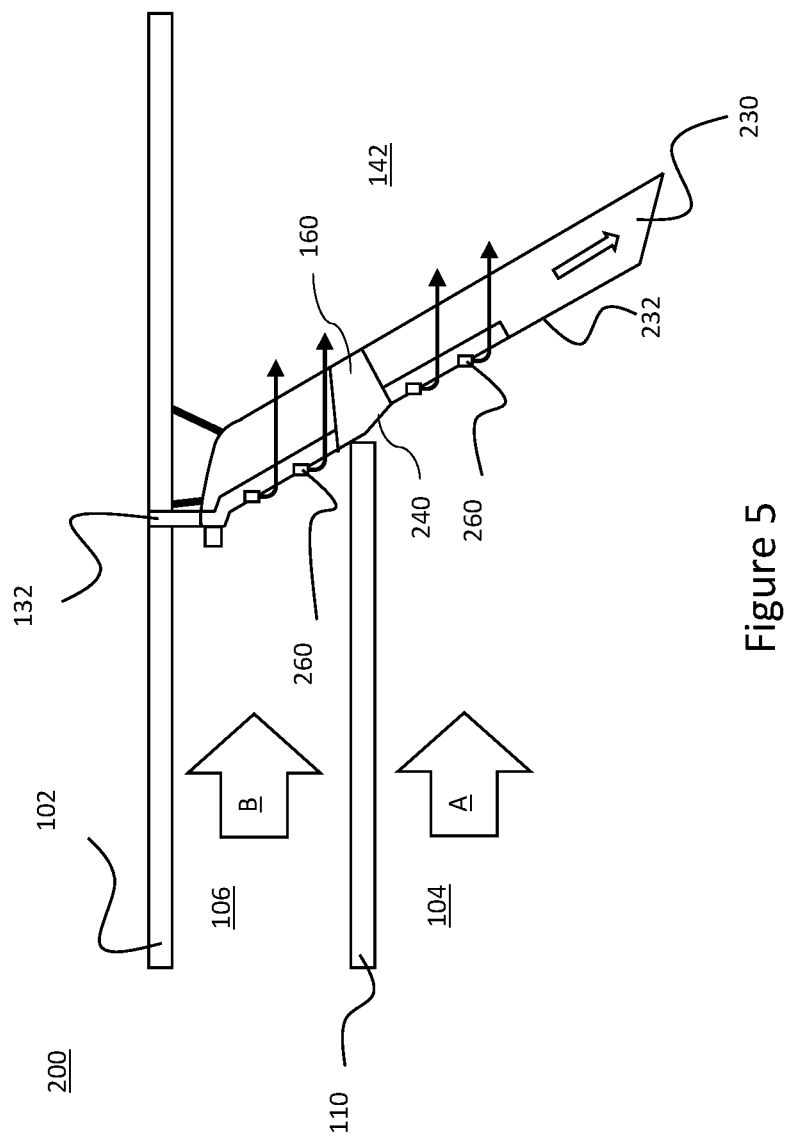

Embodiments will now be described by way of example only, with reference to the Figures, in which:

FIG. 1 schematically shows a sectional side view of a gas turbine engine;

FIG. 2 schematically shows a side sectional view of a gas turbine engine with a first example reheat assembly;

FIG. 3 schematically shows a side sectional view of a portion of the reheat assembly;

FIG. 4a schematically shows an axial cross-sectional view of an integrated flameholder of the reheat assembly;

FIG. 4b schematically shows a side cross-sectional view of an atomiser portion of the integrated flameholder of the reheat assembly through the section A-A shown on FIG. 4a; and FIG. 5 schematically shows side cross-sectional view of a second example reheat assembly.

FIG. 1 illustrates a typical gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A and conveys the core airflow A through a core duct defined by an inner casing 32. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18 between it and the inner casing 32. The bypass airflow B flows through the bypass duct 22, without passing through the engine core. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 2 shows the gas turbine engine 10 comprising a first example reheat assembly 100. The reheat assembly comprises an axially extending jetpipe casing 102 and a support duct 110 within the jetpipe casing 102. The support duct 110 extends axially from an upstream end of the jetpipe casing 102 (i.e., an end closest to the air intake 12), at least partially through the jetpipe casing 102 in a direction towards a downstream end of the jetpipe casing 102 (i.e., an end further from the air intake 12). The jetpipe casing 102 defines a reheat core section 104 configured to duct the core airflow A and a reheat bypass section 106 configured to duct the bypass airflow B. The reheat bypass section 106 is annular and disposed radially outwardly from the reheat core section 104. The support duct 110 at least partially separates the reheat bypass section 106 from the reheat core section 104 at the upstream end of the jetpipe casing 102. The jetpipe casing 102 defines an afterburning region 112 in the downstream end of the jetpipe casing 102 in which core airflow A and bypass airflow B from the reheat core section 104 and the reheat bypass section 106 respectively are able to mix, and in which fuel injected into the air streams is ignited to provide additional thrust.

The jetpipe casing 102 is radially aligned with the nacelle 21 and the support duct 110 is radially aligned with the inner casing 32 such that the centre of the reheat assembly 100 is collinear with the principal rotational axis 9 of the gas turbine engine. The core exhaust nozzle 20 (i.e. the outlet of the core duct) is aligned with an inlet of the reheat core section 104, and the bypass exhaust nozzle 18 (i.e. the outlet of the bypass duct 22) is aligned with an inlet of the reheat bypass section 106.

The reheat assembly 100 further comprises a plurality of integrated flameholders 130 (shown best in FIGS. 3 and 4a) extending radially inwardly from the jetpipe casing 102. The support duct 110 in this example extends up to the integrated flameholders 130, thereby separating the bypass airflow from the core airflow up to the integrated flameholders 130. In other examples, the support duct may end upstream of the integrated flameholders 130 to permit mixing of the bypass airflow and the core airflow upstream of the integrated flameholders 130.

The reheat assembly 100 further comprises a plurality of core fuel injectors 122 extending radially inwardly from the jetpipe casing 102. References to extending radially inwardly mean extending in a direction having a radially inward component. Therefore, extending radially inwardly is not limited to extending in a direction having no axial extent.

In this example, the plurality of integrated flameholders 130 are circumferentially distributed around the jetpipe casing 102. The plurality of core fuel injectors 122 are also circumferentially distributed around the jetpipe casing 102. In this example, there are an equal number of core fuel injectors 122 as there as integrated flameholders 130 and each of the core fuel injectors 122 is circumferentially aligned with a respective integrated flameholder 130. In other examples, there may be any suitable number of integrated flameholders and core fuel injectors, and they may be circumferentially distributed in any suitable pattern.

FIG. 3 shows a close-up, side sectional view of a portion of the reheat assembly 100, showing a core fuel injector 122 extending radially inwardly from the jetpipe casing 102, and one integrated flameholder 130 mounted to the jetpipe casing and extending radially inwardly from the jetpipe casing 102.

FIG. 4a shows an axial cross-sectional view of one integrated flameholder 130. Since the core fuel injector 122 is circumferentially aligned with the integrated flameholder, it cannot be seen in FIG. 4a.

Referring to both FIGS. 3 and 4a, a fuel pipe 132 extends from outside the jetpipe casing 102 to the integrated flameholder 130, and is configured to convey fuel to the integrated flameholder 130 (best seen in FIG. 3). the integrated flameholder 130 comprises an elongate flameholder body 140 extending radially inwardly from the jetpipe casing 102, through the reheat bypass section 106 and into the reheat core section 104. The flameholder body 140 is configured to promote a wake-stabilised region 142 downstream of the flameholder body 140.

The integrated flameholder 130 further comprises an integrated atomiser 150 which is configured to atomise fuel provided to the integrated flameholder 130, and to discharge the atomised fuel from the integrated flameholder 130 into the wake-stabilised region 142. The discharged atomised fuel can be easily ignited with a pilot igniter, to provide a stable flame in the wake-stabilised region, with which to ignite the fuel injected into the reheat core section 104 by the core fuel injector. In this example, both the core fuel injector 122 and the flameholder body 140 extend radially inwardly in a direction also having a downstream axial component. In other words, both the core fuel injector 122 and the flameholder body 140 extend in a slanted direction from a radially outward and upstream point to a radially inward and downstream point.

In this example, the integrated flameholder 130 also comprises a pair of atomiser arms 160 which extend circumferentially from opposing sides of the flameholder body 140. The atomiser arms 160 are disposed at a junction between the reheat core section 104 and the reheat bypass section 106 (best seen in FIG. 3). Each atomiser arm 160 comprises a respective integrated atomiser 150.

In other examples, there may be only a single atomiser arm extending from the flameholder body, or there may be no atomiser arms extending from the flameholder body. In examples where there are no atomiser arms, the integrated atomiser may be disposed anywhere along the length of the flameholder body, and configured to discharge atomised fuel into the wake stabilised region.

The integrated flameholder 130 further comprises an integrated fuel conduit 144 extending from the fuel pipe 132 at the jetpipe casing 102 within the flameholder body 140 through the reheat bypass section 106 and to the atomiser 150. In this example, having two opposing atomiser arms 160, the fuel conduit 144 bisects to extend circumferentially in each atomiser arm 160 (best seen in FIG. 4a).

FIG. 4b shows a side cross-sectional view of an example atomiser arm 160 through section A-A shown in FIG. 4a. In this example, each integrated atomiser 150 in the atomiser arm 160 comprises a mixing chamber 152. The atomiser arm 160 comprises a core mixing inlet 164 into the mixing chamber 152 configured to receive core air from the reheat core section 104, and a bypass mixing inlet 166 to the mixing chamber 152 configured to receive bypass air from the reheat bypass section 106. In other examples, there may be any suitable number of core mixing inlets and bypass mixing inlets to the mixing chamber.

The atomiser arm 160 further comprises a plurality of fuel inlets 162 to the mixing chamber 152 (only one can be seen in the cross-section in FIG. 4b). The fuel inlets 162 are provided in the form of holes in the fuel conduit 144 within the mixing chamber 152. In other examples, there may be only a single fuel inlet, which may also be in the form of a hole in the conduit, or may simply be an outlet of the fuel conduit into the mixing chamber.

The fuel which is received from the fuel inlets 162 in the mixing chamber 152 is atomised in the mixing chamber in the bypass air and the core air received through the bypass mixing inlets 166 and the core mixing inlet 164 respectively, due to the high temperature of the air in the mixing chamber 152.

The atomiser arm 160 also comprises a mixing outlet in the form of an array of mixing outlet holes 168 from the mixing chamber 152 through which the atomised fuel can discharge into the wake-stabilised region 142 (shown in FIG. 3). Having an array of small mixing outlets 168, rather than a single larger mixing outlet, further helps to disperse the air/fuel mixture more evenly into the wake-stabilised region 142 and to allow the atomisation to continue, such that the atomised fuel can be more easily ignited in the wake-stabilised region. In other examples, there may be only a single mixing outlet. In such examples with only a single mixing outlet, there may be other internal arrangements within the mixing chamber to ensure that atomisation can progress further before the air/fuel mixture is discharged from the mixing chamber.

In this example, the air flow through the bypass mixing inlets 166 comes from a bypass channel 170 in the atomiser arm 160. The bypass channel 170 is disposed upstream of the mixing chamber 152 within the atomiser arm 160 of the integrated flameholder 130. The bypass channel 170 is configured to receive bypass air from the reheat bypass section 106 via an inlet 172 to the integrated flameholder 130 within the reheat bypass section 106, and to discharge the bypass air into the mixing chamber 152 via the bypass mixing inlets 166. This bypass channel 170 provides cooling air to cool the integrated flameholder 130, and further channels can be distributed throughout the integrated flameholder 130, including within the flameholder body 140, which are connected to the bypass channel 170 to thereby cool the whole integrated flameholder 130.

Having such an integrated flameholder 130 with an integrated atomiser 150 allows the integrated flameholder 130 to be mounted directly to the jetpipe casing 102, which removes complex mounting arrangements of the flameholder to the support duct. Such complex mounting arrangements typically obstruct the reheat bypass duct, thereby incurring pressure losses in the bypass airflow and reducing efficiency of the reheat assembly. Further, having the integrated atomiser removes the need for a separate vaporiser in the bypass duct, which typically also requires complex mounting arrangements and separate fuel lines through the reheat bypass section which are vulnerable to the high temperatures experienced within the jetpipe casing. Integrating these components into a single integrated flameholder further reduces parts in the whole reheat assembly, making manufacturing easier, as well as repair and replacement of parts.

In the examples above, the integrated atomiser 150 is a part of the atomiser arm 160. In other examples, the integrated atomiser may be disposed within the atomiser arm but not necessarily formed as a part of the arm. For example, any suitable atomisers may be used, and may be disposed within each atomiser arm, or if there are no atomiser arms, may be disposed on the flameholder body. It should be noted that there may be a plurality of atomisers disposed in each atomiser arm, with the outlet to each atomiser forming an outlet of the atomiser arm to discharge fuel atomised in bypass air and core air directly into the wake-stabilised region. Some atomisers may comprise, for example, an elongate channel defined within a shroud, through which fuel is ducted. The fuel may be swirled with turning vanes within the channel, or may not be swirled in an example with no turning vanes. Other suitable atomisers include flat fan atomisers.

In some examples, the core fuel injection may comprise a plurality of fuel injection ports, which may be radially distributed to inject fuel into the reheat core section. There may additionally be fuel injection ports which are configured to inject fuel into the reheat bypass section.

FIG. 5 shows a second example reheat assembly 200 comprising the same features as the first example reheat assembly 100, which are represented by like reference numerals.

The second example reheat assembly 200 differs from the first example reheat assembly 100 in that the core fuel injector is integrated into the integrated flameholder 230. In this example, the integrated flameholder 230 has a similar configured to the first example integrated flameholder, but is modified to have a plurality of fuel injection ports 260 disposed on a leading edge 232 of the body 240 integrated flameholder 230, and configured to discharge fuel into the airflow past the integrated. The plurality of fuel injection ports includes a plurality of core fuel injection ports (only two are shown for simplicity) and a plurality of bypass fuel injection ports (only two are shown for simplicity). Each core fuel injection port 260 is configured to discharge a flow of fuel into the reheat core section 104 for mixing with the core flow of air A. Each bypass fuel injection port 260 is configured to discharge a flow of fuel into the reheat bypass section 106 for mixing with the bypass flow of air B.

In this example, the plurality of fuel injection ports 260 are offset with respect to one another along a radial direction of the jetpipe casing 102. This ensures that each fuel injection port 260 injects fuel into the jetpipe casing 102 at a different radial location. The provision of a plurality of core fuel injection ports 260 offset with respect to each other along the radial direction of the jetpipe casing 102 enables better control of thrust produced by igniting the fuel in the core airflow A. Similarly, the provision of the plurality of bypass fuel injection ports offset with respect to each other along the radial direction of the jetpipe casing 102 enables further improved control of thrust produced by igniting the fuel injected into the bypass airflow B.

In other examples, there may be only a single core fuel injection port which may be disposed on the integrated flameholder, and configured to discharge fuel into the reheat core section.

In this example, each of the plurality of fuel injection ports 260 is configured to discharge the respective flow of fuel in a direction within the plane perpendicular to the axial direction of the jetpipe casing 102. In other examples, the discharge of fuel may not be fully perpendicular to the axial direction, but may be in a direction having a component perpendicular to the axial direction of the jetpipe casing 102 (i.e., not parallel to the axial direction of the jetpipe casing 102). Discharging fuel in such a direction improves the mixing of the fuel in the air flow in which it is discharged, by increasing atomisation of the fuel (i.e., creating smaller droplets of fuel) due to the increased difference in relative velocity between the fuel being discharged and the core airflow A and the bypass airflow B respectively (i.e., due to the increase in shear stress between the fuel and the air, which shears the fuel into smaller droplets). In yet further examples, the discharge of fuel may be in a direction parallel to the axial direction Z of the jetpipe casing 310.

Fully integrating the fuel injection ports 260 and the atomiser 150 into the integrated flameholder 230 provides further advantages in removing the obstruction of the core fuel injector 122 upstream of the integrated flameholder 230, such that pressure losses can be reduced, thereby increasing efficiency of the reheat assembly 200. Moreover, such integration of the integrated flameholder 130, 230 reduces the part count of the reheat assembly 100, 200 and improves the fuel supply system which does not need to supply fuel to as many locations.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

What is claimed is:

1. A reheat assembly for a gas turbine engine, the reheat assembly comprising;
    a jetpipe casing defining a reheat core section configured to duct a core flow of air and a reheat bypass section configured to duct a bypass flow of air, wherein the reheat bypass section is disposed radially outward of the reheat core section, and the reheat core section and the reheat bypass section are at least partially separated by a support duct;
    an integrated flameholder mounted to the jetpipe casing, and a fuel pipe configured to convey fuel to the integrated flameholder, wherein:
        the integrated flameholder comprises:
            a flameholder body extending radially inward from the jetpipe casing through the reheat bypass section and into the reheat core section to promote a wake-stabilised region downstream of the flameholder body; and
            an integrated atomiser configured to atomise fuel provided to the integrated flameholder and to discharge the atomised fuel into the wake stabilised region;
        the integrated flameholder comprises an atomiser arm extending circumferentially from the flameholder body at a junction between the reheat core section and the reheat bypass section, the atomiser arm comprising the integrated atomiser;
        each atomiser arm comprises:
            a mixing chamber,
            a fuel inlet to the mixing chamber,
            a core mixing inlet to the mixing chamber configured to receive core air from the reheat core section,
            a bypass mixing inlet to the mixing chamber configured to receive bypass air from the reheat bypass section, and
            a mixing outlet from the mixing chamber:
        the mixing chamber is configured to atomise the fuel in the bypass air and core air received within the mixing chamber and to discharge the atomised fuel through the mixing outlet; and
        the mixing outlet comprises an array of outlet holes distributed along the respective atomiser arm.

2. The reheat assembly according to claim 1, wherein the atomiser arm comprises a pair of atomiser arms extending circumferentially from opposing sides of the flameholder body, wherein each atomiser arm comprises a respective integrated atomiser.

3. The reheat assembly according to claim 1, wherein the integrated flameholder comprises an integrated fuel conduit passing from the fuel pipe through the mixing chamber and comprising an outlet at the mixing chamber corresponding to the fuel inlet to convey fuel from the fuel pipe to the mixing chamber.

4. The reheat assembly according to claim 1, wherein the integrated flameholder further comprises a bypass channel configured to receive bypass air from the bypass section, and to discharge the bypass air into the mixing chamber via the bypass mixing inlet.

5. The reheat assembly according to claim 1, wherein the integrated flameholder comprises a fuel outlet on a leading edge of the flameholder body, configured to discharge fuel into the reheat core section upstream of the wake stabilised region.

6. The reheat assembly according to claim 1, comprising a plurality of integrated flameholders circumferentially distributed around the jetpipe casing.

7. The reheat assembly according to claim 1, comprising at least one core fuel injection port disposed on, and integrated with the integrated flameholder, wherein the at least one core fuel injection port is configured to discharge fuel into the core flow of air and the at least one bypass fuel injection port is configured to discharge fuel into the bypass flow of air.

8. The reheat assembly according to claim 7, wherein the at least one core fuel injection port is disposed on a leading edge of the flameholder.

9. A gas turbine engine comprising:
    an engine core;
    an inner casing which defines a core duct configured to convey a core flow of air through the engine core;
    a nacelle which defines a bypass duct configured to convey a bypass flow of air through the gas turbine engine without passing through the engine core; and
    a reheat assembly according to claim 1, wherein the jetpipe casing is attached to the nacelle and the support duct is radially aligned with the inner casing such that a reheat core inlet is aligned with an outlet of the core duct and wherein a reheat bypass inlet is aligned with an outlet of the bypass duct.

10. An aircraft comprising the gas turbine engine of claim 9.

* * * * *